US012609116B2

(12) United States Patent
Choi et al.

(10) Patent No.: US 12,609,116 B2
(45) Date of Patent: Apr. 21, 2026

(54) ELECTRONIC APPARATUS AND METHOD FOR CONTROLLING THEREOF

(71) Applicant: Samsung Electronics Co., Ltd., Suwon-si (KR)

(72) Inventors: Hyungtak Choi, Suwon-si (KR); Lohith Ravuru, Suwon-si (KR); Hyeonmok Ko, Suwon-si (KR); Haehun Yang, Suwon-si (KR); Seungchul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 285 days.

(21) Appl. No.: 18/330,766

(22) Filed: Jun. 7, 2023

(65) Prior Publication Data

US 2023/0360651 A1      Nov. 9, 2023

Related U.S. Application Data

(63) Continuation of application No. PCT/KR2023/005365, filed on Apr. 20, 2023.

(30) Foreign Application Priority Data

May 9, 2022      (KR) ......................... 10-2022-0056868
Sep. 1, 2022      (KR) ......................... 10-2022-0110769

(51) Int. Cl.
*G10L 15/22*      (2006.01)
(52) U.S. Cl.
CPC ........ *G10L 15/22* (2013.01); *G10L 2015/223* (2013.01); *G10L 2015/228* (2013.01)

(58) Field of Classification Search
USPC ......................... 704/246, 247, 251, 252, 275
See application file for complete search history.

(56) References Cited

U.S. PATENT DOCUMENTS 9,852,177 B1* 12/2017 Cheung ................. G06F 16/245
10,741,178 B2 8/2020 Jo et al.
(Continued)

FOREIGN PATENT DOCUMENTS

CN      110188167 B      3/2021
CN      113505198 A      10/2021
(Continued)

OTHER PUBLICATIONS

Stathoulopoulos; Hands-on Tutorials; How to Build a Semantic Search Engine With Transformers and Faiss; Towards Data Science; Nov. 10, 2020.
(Continued)

*Primary Examiner* — Leonard Saint-Cyr
(74) *Attorney, Agent, or Firm* — Jefferson IP Law, LLP

(57)      ABSTRACT

An electronic apparatus is provided. The electronic apparatus includes a communication device, a memory configured to store at least one instruction and one or more vector values corresponding to dialogue history information, and a processor, based on execution of the at least one instruction, configured to extract text from the dialogue content received through the communication device, calculate a vector value of the extracted text by using a predetermined encoding algorithm, and generate response information by using the calculated vector value and the stored one or more vector values.

11 Claims, 12 Drawing Sheets

600

(56)        References Cited

U.S. PATENT DOCUMENTS

| 11,194,973 | B1 * | 12/2021 | Goel | G06N 3/08 |
|---|---|---|---|---|
| 11,984,126 | B2 | 5/2024 | Choi et al. | |
| 2017/0025125 | A1 | 1/2017 | Alvarez Guevara | |
| 2019/0013017 | A1 | 1/2019 | Kang et al. | |
| 2020/0064444 | A1 | 2/2020 | Regani et al. | |
| 2020/0090651 | A1 * | 3/2020 | Tran | G06N 3/10 |
| 2020/0097496 | A1 * | 3/2020 | Alexander | G06F 16/355 |
| 2020/0097544 | A1 * | 3/2020 | Alexander | G06F 40/35 |
| 2020/0097563 | A1 * | 3/2020 | Alexander | G06Q 30/01 |
| 2020/0395008 | A1 | 12/2020 | Cohen et al. | |
| 2021/0034678 | A1 | 2/2021 | Hashimoto et al. | |
| 2021/0142794 | A1 * | 5/2021 | Mathias | G10L 15/22 |
| 2022/0108080 | A1 * | 4/2022 | Munavalli | G06N 3/08 |
| 2022/0310096 | A1 | 9/2022 | Choi et al. | |

FOREIGN PATENT DOCUMENTS

| KR | 10-2019-0133931 | A | 12/2019 |
|---|---|---|---|
| KR | 10-2098003 | B1 | 4/2020 |
| KR | 10-2020-0105057 | A | 9/2020 |
| KR | 10-2020-0143991 | A | 12/2020 |
| KR | 10-2297849 | B1 | 9/2021 |
| KR | 10-2022-0020723 | A | 2/2022 |

OTHER PUBLICATIONS

International Search Report with Written Opinion and English translation dated Jul. 24, 2023; International Appln. No. PCT/KR2023/005365.

* cited by examiner

<u>1000</u>

300

<u>300'</u>

1) Training Neural Retrieval Model

2) Neural Retrieval Index creation

ELECTRONIC APPARATUS AND METHOD FOR CONTROLLING THEREOF

CROSS-REFERENCE TO RELATED APPLICATION(S)

This application is a continuation application, claiming priority under § 365(c), of an International application No. PCT/KR2023/005365, filed on Apr. 20, 2023, which is based on and claims the benefit of a Korean patent application number 10-2022-0056868, filed on May 9, 2022, in the Korean Intellectual Property Office, and of a Korean patent application number 10-2022-0110769, filed on Sep. 1, 2022, in the Korean Intellectual Property Office, the disclosure of each of which is incorporated by reference herein in its entirety.

BACKGROUND

1. Field

The disclosure relates to an electronic apparatus and a method for controlling thereof. More particularly, the disclosure relates to an electronic apparatus that may vectorize and store user dialogue history and a method for controlling thereof.

2. Description of Related Art

In recent years, a service (e.g., schedule management service, reservation service, or shopping service) corresponding to a confirmed user request is provided by checking a user request (or command) from a voice or a text input through a message application (e.g., messenger application, or chat application) or a voice recognition application.

In order to accurately respond to the service requested by the user, user intent and command from the text or the voice input by the user should be accurately grasped.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus which may vectorize and store user dialogue history and a method for controlling thereof.

Additional aspects will be set forth in part in the description which follows and, in part, will be apparent from the description, or may be learned by practice of the presented embodiments.

In accordance with an aspect of the disclosure, an electronic apparatus is provided. The electronic device includes a communication device, a memory configured to store at least one instruction and one or more vector values corresponding to dialogue history information, and a processor, based on execution of the at least one instruction, configured to extract text from the dialogue content, calculate a vector value of the extracted text by using a predetermined encoding algorithm, and generate response information by using the calculated vector value and the stored one or more vector values.

In accordance with another aspect of the disclosure, a method performed by an electronic apparatus is provided. The method includes storing one or more vector values corresponding to dialogue history information, receiving dialogue content, generating response information by using the calculated vector value and the stored one or more vector values. Here, the generating of the response information may include extracting text from the dialogue content, calculating a vector value of the extracted text by using a predetermined encoding algorithm, and obtaining the response information by using the calculated vector value and the stored one or more vector values.

In accordance with another aspect of the disclosure, a non-transitory computer-readable recording medium including a program for executing a method for controlling an electronic apparatus is provided. The method includes storing one or more vector values corresponding to dialogue history information, receiving a vector value corresponding to text included in dialogue content, generating response information corresponding to the dialogue content, and transmitting the response information. Here, in the generating of the response information, the response information is generated by selecting a vector value having predetermined similarity with the received vector value among the stored one or more vector values, converting each of the selected vector value and the received vector value to text by using a predetermined decoding algorithm, and using a user request and slot information, confirmed using the text corresponding to the received vector value, and the slot information confirmed using the vector value having the predetermined similarity.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
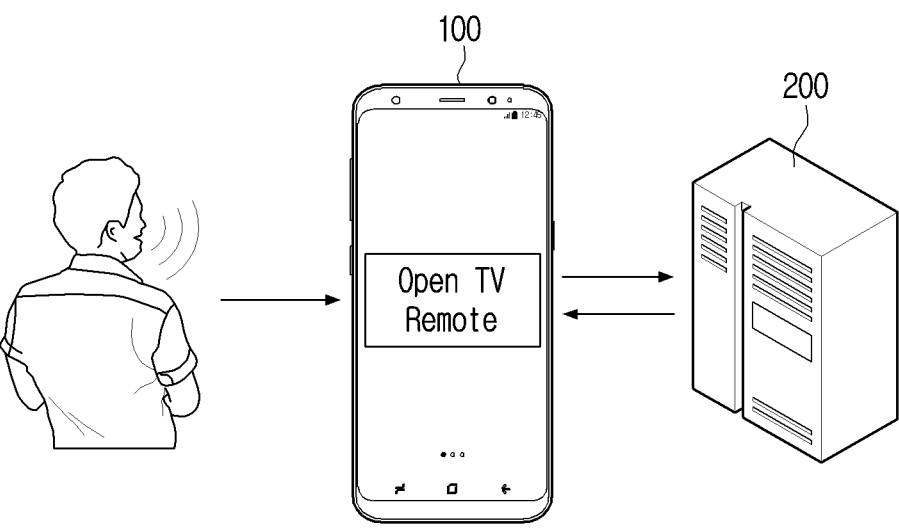
FIG. 1 is a view showing a dialogue system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, an expression "have," "may have," "include," "may include," or the like, indicates existence of a corresponding feature (for example, a numerical value, a function, an operation, a component such as a part, or the like), and does not exclude existence of an additional feature.

In the disclosure, an expression "A or B," "at least one of A and/or B," "one or more of A and/or B," or the like, may include all possible combinations of items enumerated together. For example, "A or B," "at least one of A and B" or "at least one of A or B" may indicate all of 1) a case where at least one A is included, 2) a case where at least one B is included, or 3) a case where both of at least one A and at least one B are included.

Expressions "first," "second," or the like, used in the disclosure may indicate various components regardless of a sequence and/or importance of the components, will be used only in order to distinguish one component from the other components, and do not limit the corresponding components.

In case that any component (for example, a first component) is mentioned to be "(operatively or communicatively) coupled with/to" or "connected to" another component (for example, a second component), it is to be understood that any component is directly coupled to another component or coupled to another component through still another component (for example, a third component). On the other hand, in case that any component (for example, the first component) is mentioned to be "directly coupled to" or "directly connected to" another component (for example, the second component), it is to be understood that still other component (for example, the third component) is not present between any component and another component.

An expression "configured (or set) to" used in the disclosure may be replaced by an expression "suitable for," "having the capacity to," "designed to," "adapted to," "made to," or "capable of" depending on a situation. The expression "configured (or set) to" may not necessarily indicate "specifically designed to" in hardware. Instead, an expression a device "configured to" in any situation may indicate that the device may "perform~" together with another device or component. For example, "a processor configured (or set) to perform A, B, and C" may be a dedicated processor (for example, an embedded processor) for performing the corresponding operations or a generic-purpose processor (for example, a central processing unit (CPU) or an application processor) that may perform the corresponding operations by executing one or more software programs stored in a memory device.

In addition, in the disclosure, a "value" may be defined as a concept that includes a vector as well as a scalar value. In addition, in the disclosure, an expression such as "calculate" or "compute" may be replaced with an expression of generating a result of the corresponding calculation or computation.

Meanwhile, dialogue history information of the disclosure may indicate text information including a user request and a response of an electronic apparatus. The user request and a response of the electronic apparatus may be at least one of displayed in a dialogue window or speech content received by and output by the electronic apparatus. The history information may be a dialogue history between one user and one response bot, or a dialogue history between a plurality of users and one responding bot. Here, the response bot may be an automated machine program that provides a specific service based on the user request. In addition, the dialogue history information may include not only the text information directly input from the user, but also text, video, emoticons, and the like, which are voice signals or voice recognition results of the voice signals.

In addition, in the disclosure, the text information may be information including at least one user request or slot information corresponding to the user request. The text information may be referred to as phrase information, command information, request information, query, or the like. In addition, the text information may include one phrase or a plurality of phrases.

In addition, the user request may be a command requesting execution of the specific service, and the slot information may be a target object or additional description information for specifying the corresponding request. For example, in a phrase "television (TV) Turn-on," "turn-on" may be the user request, and "TV" may be the slot information. This division may be an example, and implemented in various ways based on system implementation methods. That is, in case that the user requests are classified in more detail, the above-mentioned "TV turn-on" may be one user request.

In addition, the service in the disclosure may not only include a function that may be performed by driving an application installed in a corresponding device, but also include a function that may be performed by using or controlling another device, a function that may be performed by using or controlling a plurality of devices, or the like.

In addition, in the disclosure, character data may indicate data excluding numerical data such as real numbers or imaginary numbers, and include not only data including text, but also all types of data that may convert specific information into numerical values (e.g., image data or audio data).

Mathematical operations and calculations of each step in the disclosure described below may be implemented as computer operations by a known coding method or coding designed to be suitable for the disclosure to perform the operations or calculations.

Hereinafter, embodiments of the disclosure are described in detail with reference to the accompanying drawings.

FIG. 1 is a view showing a dialogue system according to an embodiment of the disclosure.

Referring to FIG. 1, a dialogue system 1000 may include a terminal device 100 and a server 200.

The terminal device 100 may receive dialogue information from a user and transmit the received dialogue information to the server 200. Here, the dialogue information may be text directly input by the user or a voice recognition result obtained by converting a user utterance voice into text through voice recognition.

The dialogue information may be referred to as dialogue content. For example, the dialogue content may include text (e.g., a phrase), voice, video, emoticon, and the like. Hereinafter, for ease of explanation, text-based information may be referred to as the dialogue information, and information including the content other than the text may be referred to as the dialogue content.

The server 200 may receive the dialogue information from the terminal device 100, generate response information corresponding to the received dialogue information, and transmit the same to the terminal device 100.

Here, the server 200 may generate the response information by using only current dialogue information, generate the response information by using only the text included in the dialogue history information of a current user, or generate the response information by using vector values corresponding to another user dialogue history information as well as current user dialogue history information.

For example, in case that the received dialogue information includes the text "Play Music A," the server 200 may identify that the user request (or intent) is a music playback command of "Music A" (slot), and then generate the response information indicating that Music A needs to be played through a music playback application.

Meanwhile, in proceeding with a service corresponding to the user request, it may be difficult to proceed with the specific service only with the above-described dialogue information, a number of methods may exist to perform the request, or it may be difficult to proceed with the specific service only with the currently input dialogue information.

For example, in case that the received dialogue information includes the text "Turn on the TV," it may be difficult to distinguish whether the request is a request for controlling a separate electronic device, that is, the TV, or a request for executing a specific application included in the terminal device 100.

That is, a first application for controlling a separate TV device and a second application for directly controlling TV content may be installed in the terminal device 100. In this case, it may be difficult to accurately determine the user request "Turn on the TV" only with the corresponding dialogue information.

In this case, the server 200 may use an existing user dialogue history. Here, in case that there is a history in which the user previously requested the control of the separate TV device, the server may determine that the control of the TV device is requested among two options, and generate the response information for controlling the separate TV device.

As such, in case that the user dialogue history includes information (that is, slot information) to specify the user request, the server 200 may utilize the corresponding information to generate the response information by utilizing more accurate response information.

In addition, it may also be difficult for the server 200 to generate accurate response information in case of failing to accurately recognize the user utterance. For example, in case that the user utters using a non-standard language, or the user's age is low, the server may not accurately recognize the intent of the user utterance or a content of the slot. For example, the server 200 may recognize a TV object as the TV. Accordingly, the server 200 may not recognize the user request in case that the user refers to the TV by a different name such as TV set, a TV box, etc.

There may be a response history of turning on the external TV in response to another user's request "Turn on the TV." In this case, the server 200 may generate the response information by referring to the above-described history of another user without re-confirming utterance intent or the like to the current user.

In this way, in a process of generating the response information for user dialogue information, the server 200 may provide improved service performance by generating the response information by utilizing not only the current user dialogue history but also another user dialogue history.

However, a privacy issue may occur in case that another user dialogue history is stored as it is to be utilized.

Therefore, in the disclosure, the user dialogue history is not stored as it is, and the dialogue history may be encoded into a predetermined natural language processing model and stored to be used. Hereinafter, a process of conversion to the predetermined natural language processing model may be referred to as an encoding processing, and may also be referred to as encrypting and storing the user dialogue history.

Detailed operations thereof performed by the server 200 are described below with reference to FIGS. 4 to 8.

As described above, the dialogue system 1000 according to the disclosure may generate the more accurate response information by using not only the user dialogue history information, but also another user's encoded dialogue history (or another user's encrypted dialogue history) in the process of generating a response message to user dialogue content. In addition, the dialogue history may be encoded (or encrypted) and stored, and it is thus also possible to prevent the privacy issue.

Figure 2:
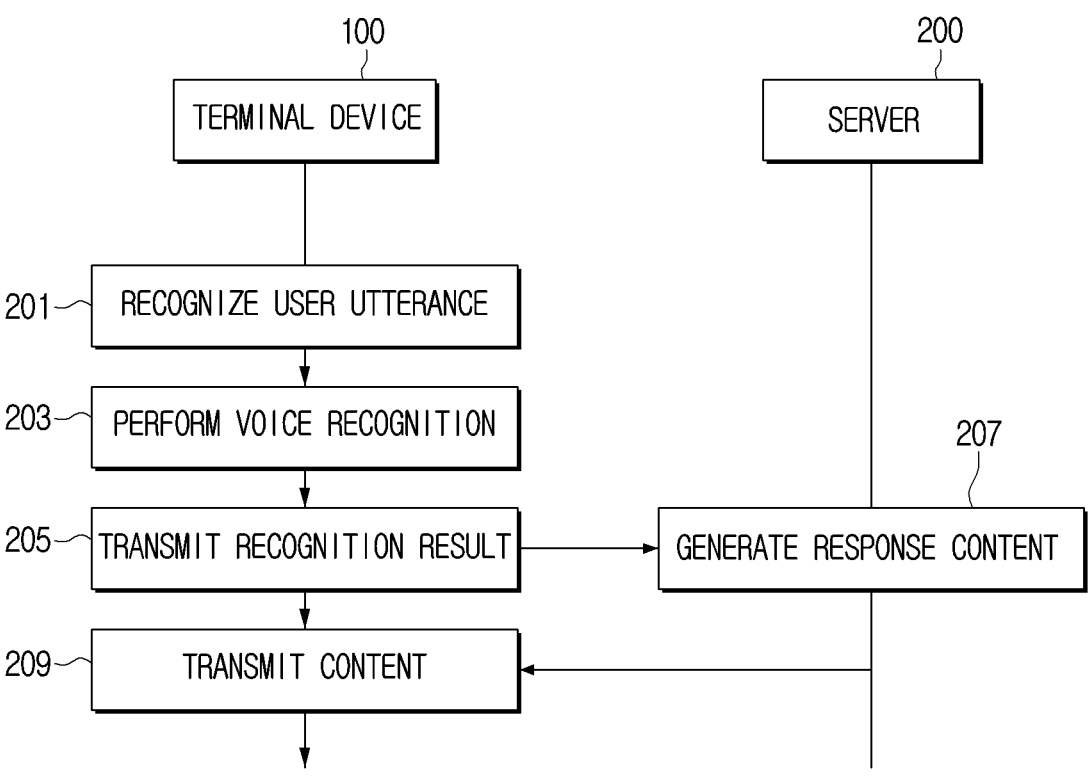
FIG. 2 is a sequence diagram showing an operation of the dialogue system according to an embodiment of the disclosure.

FIG. 2 is a sequence diagram showing an operation of the dialogue system according to an embodiment of the disclosure. In detail, FIG. 2 is a view showing an example of the dialogue system based on the user utterance.

Referring to FIG. 2, in case of receiving the user utterance from the user at operation 201, the terminal device 100 may perform the voice recognition of the received utterance to generate the dialogue information (i.e., text) corresponding to the user utterance at operation 203.

In case that the utterance for the corresponding service is continuously in progress, the terminal device 100 may generate the dialogue content including the corresponding text and a previous response from the server 200. Meanwhile, this dialogue content may also be generated from the server 200 instead of the terminal device 100.

The terminal device 100 may generate the dialogue text, and then transmit the content to the server 200 at operation 205.

The server 200 may receive the corresponding dialogue content, and then generate response information (or response content) corresponding to the corresponding content at operation 207. In detail, the server 200 may apply the corresponding dialogue content to a natural language understanding algorithm to check the user intent and the slot, and generate the response information corresponding to the confirmed intent and slot.

The server 200 may then transmit the generated response content to the terminal device 100 at operation 209. This response information may only include the text, or may include the text or content information corresponding to the user request.

The terminal device 100 receiving the response information may perform the corresponding response content.

For example, in case that the user utterance is "Play Music A!," the terminal device 100 may generate the text corresponding to the input utterance and transmit the corresponding text to the server 200. Correspondingly, the server 200 may generate the response content requesting playback of music content "A" in a music application of the terminal device 100, and provide the same to the terminal device 100.

The terminal device 100 receiving the response content may drive the music application and play "Music A" by using the corresponding music application.

Meanwhile, in the above process, the user may use a similar term for the title "Music A" instead of the same term as "A." Alternatively, even though the user utterance is accurate, the terminal device 100 may recognize "A" similar to "A" rather than "A" due to an error in a voice transmission process or in the voice recognition. For example, for music content having a title of "Dun Dun," no music content having a title of "Dung Dung" may exist in a music database (DB) even though the user utterance is "Play Dung Dung Music!" In this case, the terminal device 100 may ask again what music content the user requests based on the existing dialogue system, or play the music content different from the user request that has a pronunciation similar to "Dung Dung."

However, the disclosure uses another user dialogue history information. Therefore, the server 200 may calculate a vector value corresponding to "playing Music Dung Dung" by using a predetermined encoding algorithm, select a candidate vector value similar to the calculated vector value among the pre-stored one or more vector values, and decode the selected vector value to thus identify that the intent of the user utterance is "Play Music Dun Dun." An advantage of using another user dialogue history is described hereinabove by using a simple example, this operation is only an example, and may be implemented in various types. More specific details using the vector value are described below with reference to FIG. 3.

Meanwhile, an operation example of a voice-based dialogue system is shown and described with reference to FIG. 2. However, the system may also be implemented to perform the same operation in case that the text is directly input from the user. That is, the disclosure may also be applied to a dialogue window (or chat window)-based dialogue system.

Meanwhile, the description provided with reference to FIGS. 1 and 2 describes that the terminal device 100 and the server 200 are cooperatively operated to perform the dialogue service. However, the above-described functions may be performed by one device.

In addition, FIG. 2 shows that the server 200 receives the corresponding dialogue content and calculates the vector value. However, the above-described encoding operation may be performed by the terminal device 100. Such an implementation example is described below with reference to FIG. 12.

Figure 3:
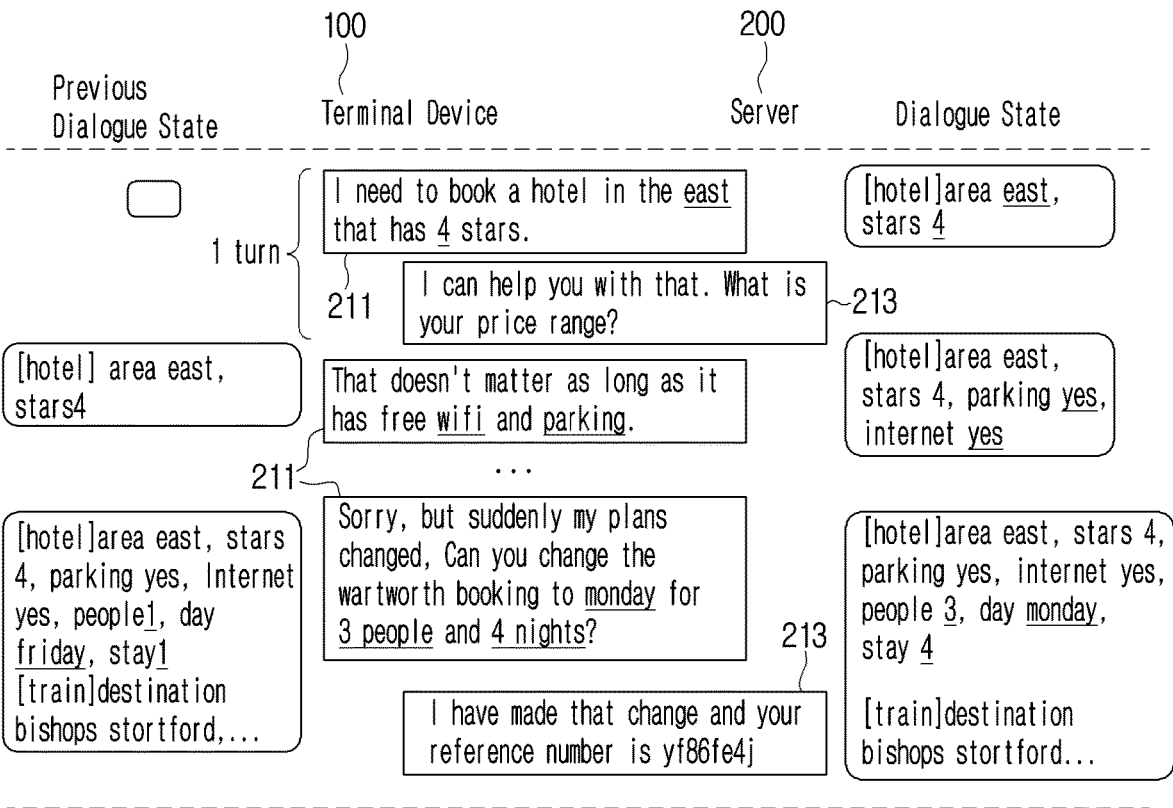
FIG. 3 is a view for explaining an operation example of a task_oriented dialogue (TOD) system according to an embodiment of the disclosure.

FIG. 3 is a view for explaining an operation example of a task_oriented dialogue (TOD) system according to an embodiment of the disclosure. In detail, FIG. 3 shows an example of a large-scale multi-domain wizard-of-oz (MutliWOZ) data set in which the user may reserve a hotel or a taxi.

Here, a dialogue state may be represented as a <slot-value> pair of a specific domain. A first turn (or 1 turn) may represent single user utterance 211 captured by the terminal device 100 and a response 213 of the system thereto by the server 200. In addition, the dialogue state may be updated based on a previous dialogue state, current user utterance, or previous 1-turn context.

The task-oriented dialogue (TOD) system may be a system that enhances interaction between the user and a computer system through voice dialogue and supports a user service such as hotel reservation or taxi reservation.

This dialogue system may be generally operated in a modular type such as understanding of the user intent, request execution, and a resultant response to the request.

Among these operations, using the user intent may be the most important operation in performing the corresponding service, and for this operation, it may be useful to track the dialogue state.

Dialogue state tracking (DST) may be a major operation that tracks the dialogue state, which is essential information to understand an intent of a user or a purpose of the user.

It may be necessary for the dialogue state tracking to analyze user dialogue and expression in a previous turn state, extract the intent of the user or the purpose of the user, and express the dialogue state as well-defined slot and value. In case that the user dialogue spans many domains, it may be a very difficult task to accurately determine the dialogue state.

The large-scale multi-domain (MutliWOZ) data set operated in various domains has a great influence on the development of the dialogue system. Here, the domain may indicate an area related to the specific service. For example, each of the hotel reservation, taxi reservation, and train reservation may be the domain, and this domain may be configured in various ways based on a system configuration method. In addition, this domain may also be referred to as the user request (or intent).

FIG. 3 shows an example of a data set in which the user starts a dialogue with the hotel reservation, and then changes the hotel reservation.

Here, the dialogue state may be defined as a list of the <slot-value> pairs for each domain. For example, the <slot-value> pairs may be ([hotel] people 2 stay 5 days), ([taxi] arrival Hotel Santa)).

This dialogue state may be considered as expression of the entire dialogue, and used in modules such as the task and response of the system. Therefore, an error in the dialogue state may be propagated not only to the above-described module, but also to the dialogue state of a next turn.

To address this problem, the disclosure replaces the previous dialogue state with ground truth of a minimalist transfer learning (MinTL) model. Here, the ground truth may indicate a case of using actual dialogue information, not the dialogue state generated in a previous dialogue turn.

Table 1 below shows an error analysis value in case of using the actual dialogue information rather than using state information of a previous dialogue.

TABLE 1

|  | Pedicted Dialogue State | Ground Truth Dialogue State |
|---|---|---|
| MinTL (T5-small) | 51.0 | 78.0 |
| MinTL (T5-base) | 51.4 | 78.3 |

Referring to Table 1, an error propagation is reduced by 27% when the previous dialogue is used instead of the dialogue state information used in the previous dialogue turn.

Therefore, the disclosure reinforces the dialogue state by using similar dialogue context in a pre-computed index to reduce a performance gap and the error propagation. To this end, the disclosure uses a large-scale pre-trained module. This pre-trained large-scale module may be very efficient compared to sparse representation and a search-based approach method, and may generate a better response in response to an open-ended question, resulting in high response accuracy for a search-based result.

Meanwhile, this operation may be required to use natural text, such as a general question or passage. However, as described above, the privacy issue may occur in case that another user's text or passage is stored and used as it is. Therefore, the disclosure may vectorize and store the above-mentioned text (or passage), and generate and use a database (DB) in which the vectorized values are structured and indexed.

In this way, it is possible to efficiently search for another user dialogue having the similar text to the current user dialogue even using the vectorized data, and perform response processing with high accuracy by utilizing the vector value corresponding to a retrieved another user dialogue.

This algorithm may be referred to as a neural-retrieval augmentation-dialogue state tracking (NRA-DST) framework, and the specific operation and configuration of the corresponding framework are described in detail with reference to FIGS. 7 and 8.

Figure 4:
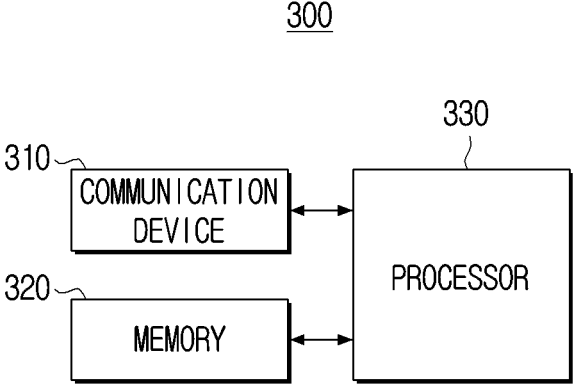
FIG. 4 is a block diagram showing a configuration of an electronic apparatus according to an embodiment of the disclosure.

FIG. 4 is a block diagram showing a configuration of an electronic apparatus according to an embodiment of the disclosure.

In detail, the electronic apparatus in the system of FIG. 1 may indicate a device that directly generates the response information such as the server, or a device that collects dialogue messages or voices, and generates necessary dialogue information such as the terminal device. That is, the electronic apparatus of FIG. 4 may be operated as the terminal device 100 of FIG. 1 or the server 200 of FIG. 1. In addition, this device may also perform the functions of the terminal device 100 and server 200 of FIG. 1 as one device.

An electronic apparatus 300 of FIG. 4 may be any of various devices such as a personal computer (PC), a laptop computer, a smartphone, a tablet, and a server. Referring to FIG. 4, the electronic apparatus 300 may include a communication device 310, a memory 320, and a processor 330.

The communication device 310 may connect the electronic apparatus 300 to an external device (not shown), and may be connected to the external device through a local area network (LAN) or the Internet network or through a universal serial bus (USB) port or a wireless communication (for example, cellular communication, wireless fidelity (Wi-Fi) 802.11a/b/g/n, near field communication (NFC), or Bluetooth) port. The communication device 310 may also be referred to as a transceiver.

The communication device 310 may receive the dialogue content (or dialogue information) from another device or transmit the dialogue content to another device. Here, the dialogue content may include one user message or messages input through several turns. Here, the user message may be the text input by the user's direct typing, a message obtained by converting the user utterance voice into the text through the voice recognition, or the audio data corresponding to the user utterance voice.

The communication device 310 may transmit the response content corresponding to the corresponding dialogue content to another device that transmits the dialogue content, or may receive the response content corresponding to the dialogue content. The response content may be information including the command information for executing the specific service, the content corresponding to information requested by the user, or guide information on an execution result of a service requested by the user.

For example, the dialogue content may include a message requesting execution of the specific application by the user. In this case, the communication device 310 may receive the response content including the command information for executing the specific application. Alternatively, the dialogue content may include a message such as ordering/ reservation of specific service such as the hotel reservation, the taxi reservation, or ordering a specific item. In this case, the communication device 310 may receive information on a result of the order or reservation requested by the user as the response content. The above-described example of the response content is only an example, and various user requests may occur in the dialogue system and various responses thereto may thus be made.

The memory 320 is a component for storing an operating system (O/S), various software, data, and the like for driving the electronic apparatus 300. The memory 320 may be implemented in various forms such as a random access memory (RAM), read-only memory (ROM), a flash memory, a hard disk drive (HDD), an external memory, and a memory card, and is not limited to any one of them.

The memory 320 may store at least one instruction. The at least one instruction may include instructions for executing an application used for executing the above-mentioned dialogue system, an application for executing the voice recognition, and various applications for executing the services corresponding to the response information.

The memory 320 may store one or more vector values corresponding to the dialogue history information. Here, the dialogue history information may include not only the current user dialogue history but also another user dialogue history. As described above, another user dialogue history may cause the privacy issue. Accordingly, in the disclosure, another user dialogue history is stored by being converted to a vector value.

The vector value may be generated using the predetermined encoding algorithm such as a bidirectional encoder representations from transformers (BERT) natural language processing model, a robustly optimized BERT pretraining approach (RoBERTa) natural language processing model, or a T5 natural language processing model. Meanwhile, another algorithm may be used in addition to the above example, as long as the corresponding algorithm is implemented to be able to convert the text to the vector value for natural language processing.

The processor 330 may control each component in the electronic apparatus 300. The processor 330 may include a single device such as a central processing unit (CPU) or an application-specific integrated circuit (ASIC), or may include a plurality of devices such as the CPU and a graphics processing unit (GPU).

The processor 330 may control the communication device 310 to generate the dialogue content by using the input text and transmit the generated dialogue content to the external device in case of receiving the text from the user or the user utterance.

Here, the processor 330 may control the communication device 310 to encode the dialogue information (e.g., text) included in the generated dialogue content into the vector value by using a predetermined algorithm, and transmit the vector value that is an encoding result to the external device.

In case of receiving the dialogue content, the processor 330 may identify the user request (or intent) and/or the slot information by using the received dialogue content. For example, the processor 330 may identify the user request or the slot information by analyzing the text included in the dialogue content by using a natural language recognition algorithm.

Here, the processor 330 may identify additional information from the received dialogue content. For example, the additional information may be at least one of time information, dialogue frequency, or user emotion information. In addition, the time information may be time information of the dialogue content, the dialogue frequency may be the number of dialogue turns to proceed with the response to the user request, and the user emotion information may be information inferred through various information such as an emoticon or a user voice tone, included in the dialogue content, and a relationship with a target (e.g., boss or married couple) included in the dialogue content. In the above, the above-mentioned information is referred to as the additional information. However, the additional information may be used as the above-mentioned slot information.

In addition, the processor 330 may determine a weight for each of the identified slot information. In detail, the processor 330 may determine the weight for each slot information based on correlation between the identified slot information and the user request. The weight may be determined based on a predetermined lookup table or through the frequency of the corresponding slot information in the dialogue content.

In addition, the processor 330 may identify whether the response information is generated only with the identified user request or slot information. In detail, the processor 330 may determine whether the response information corresponding to the identified user request is possible to be obtained by using only the identified slot information.

In case that the response information is possible to be generated by using only the text in the dialogue content, the processor 330 may generate the response information, and control the communication device 310 to transmit the generated response information.

In case of determining that the response information is difficult to be generated by using only the text in the dialogue content, the processor 330 may generate the response information by further using the one or more vector values stored in the memory 320.

In detail, the processor 330 may convert the text included in the dialogue content to a vector value by using the predetermined algorithm. For example, the processor 330 may generate one phrase as the character data included in the dialogue content, and calculate the vector value corresponding to the generated phrase by using the predetermined encoding algorithm. Alternatively, the processor 330 may divide the text included in the dialogue content into turn units (or phrase units), and calculate a vector value for each text for each turn unit (or phrase unit) by using the predetermined encoding algorithm.

Here, the processor 330 may perform processing of at least one of removing an unnecessary symbol (e.g., symbol or a special character) or the like from a phrase included in the dialogue content, identify a word corresponding to the slot information required to be included, or calculate a vector value by using a phrase based on a processing result. In addition, the processor 330 may add words corresponding to various information such as at least one of the content (e.g., emoticon), dialogue time, the dialogue frequency, or the relationship with the target (e.g., boss or married couple) included in the dialogue content to the above phrase in addition to the text included in the dialogue content.

In addition, the processor 330 may obtain the vector value having predetermined similarity with the converted vector value among the pre-stored one or more vector values. Here, the processor 330 may identify (or search for) a plurality of vector values among the pre-stored one or more vector values as the candidate vector values. For example, the processor 330 may obtain the vector value of a predetermined rank (e.g., up to the second rank or up to the third rank) among the vector values having high similarity. Here, the processor 330 may obtain the vector value similar to the converted vector value among the vector values selected to have the predetermined similarity or more.

Here, in case of checking whether the similarity is higher than the predetermined similarity, the processor 330 may use the previously confirmed weight for each slot to thus obtain the slot information having a high weight and the vector value having high similarity. For example, the slot information such as "family," "4 tickets," and "hometown" may be identified in case of reserving train tickets, and the high weight may be applied to the slot information "family." In this case, the processor 330 may identify the vector value having the predetermined similarity by searching the index in an order of family→4 tickets→hometown in a train ticket reservation domain in the stored database (DB). Alternatively, the processor 330 may use various methods such as searching for the vector value corresponding to each confirmed slot and calculating the similarity by reflecting the above-described weight for each retrieved vector value.

In addition, the processor 330 may convert the retrieved vector value to the text by using a decoding method opposite to the above-described encoding method, extract the slot information from the corresponding text, and generate the response information by using the slot information extracted from the corresponding text together with the slot information included in the dialogue content. In detail, the processor 330 may generate the response information by using the user request or the slot information, confirmed through the dialogue content, and the slot information confirmed through the text corresponding to the vector value having the predetermined similarity.

Meanwhile, the description above describes that only the slot information of the pre-stored one or more vector values is used in generating the response information. In detail, the description describes that only the slot information corresponding to the pre-stored one or more vector values is used in generating the response information because the processor 330 identifies the vector value corresponding to the user intent in a process of identifying the vector value having the predetermined similarity among the pre-stored one or more vector values. However, the user intent may be unclear from the text included in the dialogue content. In this case, contrary to the previous case, the processor 330 may identify the vector value having the predetermined similarity with the slot information included in the dialogue content among the pre-stored one or more vector values, and use the user intent corresponding to the identified vector value.

For example, the text included in the dialogue content may include only "area A." In this case, it may be unclear whether the user intent is a request to inform information of area A or a request to drive a navigation application that guides to area A. In this case, the processor 330 may identify the vector value having the similarity with area A among the pre-stored one or more vector values, and may use the user intent extracted from the identified vector value.

Here, the processor 330 may calculate a plurality of candidate vector values each having the similarity with area A, check the user intent of each of the plurality of candidate vector values, and then confirm the user intent having the highest frequency as the user intent, or use the user intent of the most recent candidate vector value among the plurality of candidate vector values.

In addition, the processor 330 may also identify the vector value having the predetermined similarity by calculating a weight value for each word corresponding to the slot or the user intent, included in the phrase in the vectorization process described above, and considering the weight for the above-mentioned word in analyzing the similarity with the pre-stored one or more vector values.

In addition, the description above describes that the electronic apparatus 300 receives the dialogue information (or dialogue content), and calculates the text in the received dialogue information as the vector value to determine its similarity with the pre-stored one or more vector values. However, another device may be implemented to perform the vectorization operation, and the electronic apparatus 300 may receive the vector value and generate the response information by using the received vector value or the pre-stored one or more vector values.

In addition, the processor 330 may update the dialogue history information based on the above-described dialogue content and the response information after providing the response of the above-described response message and store the updated dialogue history information in the memory 320. For example, the processor 330 may generate one phrase based on the character data included in the dialogue content and the above-described response information, calculate one vector value by using the predetermined encoding algorithm for the generated phrase, and store the calculated vector value in the memory 320.

As described above, the terminal device 100 according to the disclosure may use not only the user dialogue history but also the vector value corresponding to another user dialogue history in the process of generating the response information, thus generating the response information having higher accuracy. In addition, the terminal device 100 may encode and store another user dialogue history by using the predetermined algorithm rather than storing another user dialogue history as it is, thereby preventing the privacy issue.

In addition, as described above with reference to FIG. 3, the response information may have high accuracy in case of being generated by using the actual dialogue information instead of using only a specific keyword (or state information). The disclosure may store not only the keywords (i.e., intent or slot information), but also vectorize and store the text corresponding to the actual dialogue information as the dialogue history information, thereby securing high response accuracy.

Meanwhile, FIG. 4 shows that the terminal device 100 only includes basic components (i.e., communication device, memory, and processor). However, the terminal device 100 may further include various components other than the above-described components. This example is described below with reference to FIG. 5.

Figure 5:
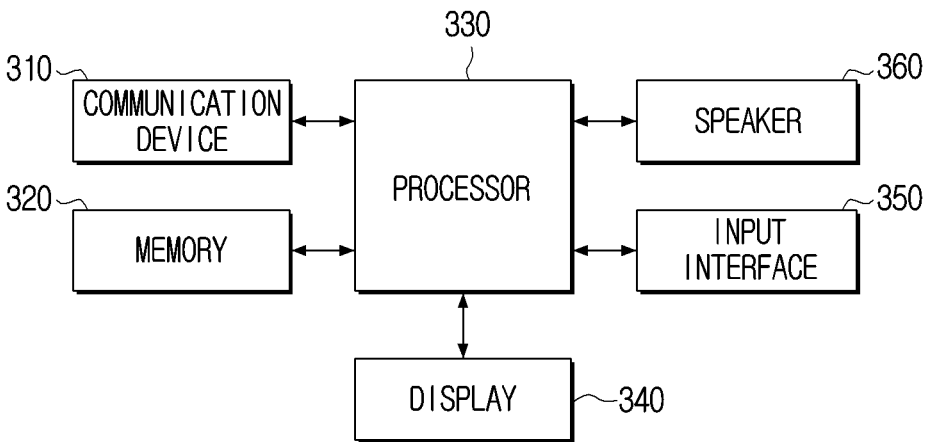
FIG. 5 is a block diagram showing another configuration of the electronic apparatus according to an embodiment of the disclosure.

FIG. 5 is a block diagram showing another configuration of the electronic apparatus according to an embodiment of the disclosure.

Referring to FIG. 5, an electronic apparatus 300' may further include a display 340, an input interface 350, and a speaker 360 in addition to the communication device 310, the memory 320, and the processor 330.

The communication device 310 and the memory 320 are already described with reference to FIG. 4, and redundant descriptions thereof are omitted.

The display 340 may display a user interface window for selecting a function supported by the electronic apparatus 300'. In detail, the display 340 may display the user interface window for selecting various functions provided by the electronic apparatus 300'. The display 430 may be a monitor such as a liquid crystal display (LCD) or organic light emitting diodes (OLED), and may be implemented as a touch screen which may simultaneously perform some functions of the input interface 350 described below.

The display 340 may display the content corresponding to the response information or the current dialogue history information.

The input interface 350 may receive, from the user, selection of a function of the electronic apparatus 300' and control command for the corresponding function. The input interface 350 may be a keyboard, a mouse, a touch pad, or the like, and may include a microphone for receiving the user voice.

The speaker 360 may output sound. The speaker 360 may output the response information corresponding to the received response message as the sound.

For example, the electronic apparatus 300' may be implemented as an artificial intelligence (AI) speaker. In this case, the processor 330 may convert the user utterance voice input through the microphone into the text and transmit the converted text to the external server 200. In addition, in case of receiving the response information from the external server 200, the electronic apparatus 300' may output the text corresponding to the received response information through the speaker 360 by using a text-to-speech (TTS) function.

In addition, the electronic apparatus 300' may continuously monitor whether a voice of a predetermined trigger command is input, and in case of determining that the input user utterance voice includes the predetermined trigger command, the processor 330 may perform the dialogue service as described above.

In addition, the electronic apparatus 300' may receive a similar trigger name similar to a currently set trigger command from the external device, use the similar trigger name as well as a trigger name set by the user in determining whether the trigger command is included to thus determine whether to start the dialogue service.

For example, "Hi Bixby" may be a current command word for starting (or waking up) the dialogue system of the electronic apparatus 300', and another user may frequently use "Hi Big~" or "Hi Bigs~." In this case, the server 200 may provide information on such a similar name to the terminal device 100 for the dialogue service to be triggered by the user utterance corresponding to "Hi Big~" and "Hi Bigs" even in the specific terminal device 100.

The electronic apparatus 300' receiving this similar trigger information may store the similar trigger information in the memory 320, and the electronic apparatus 300' may use not only the trigger command set by the user but also a similar trigger command in determining whether to start an utterance service.

FIG. 5 further shows the components (e.g., display, speaker, or user input device) different from those of FIG. 4. However, it is not necessary for the electronic apparatus 300' to be implemented to include all of the above-described components, and may only further include some of the above-described components. For example, the electronic apparatus 300' may be the AI speaker, and in this case, the electronic apparatus 300' may further include only the microphone and the speaker.

Figure 6:
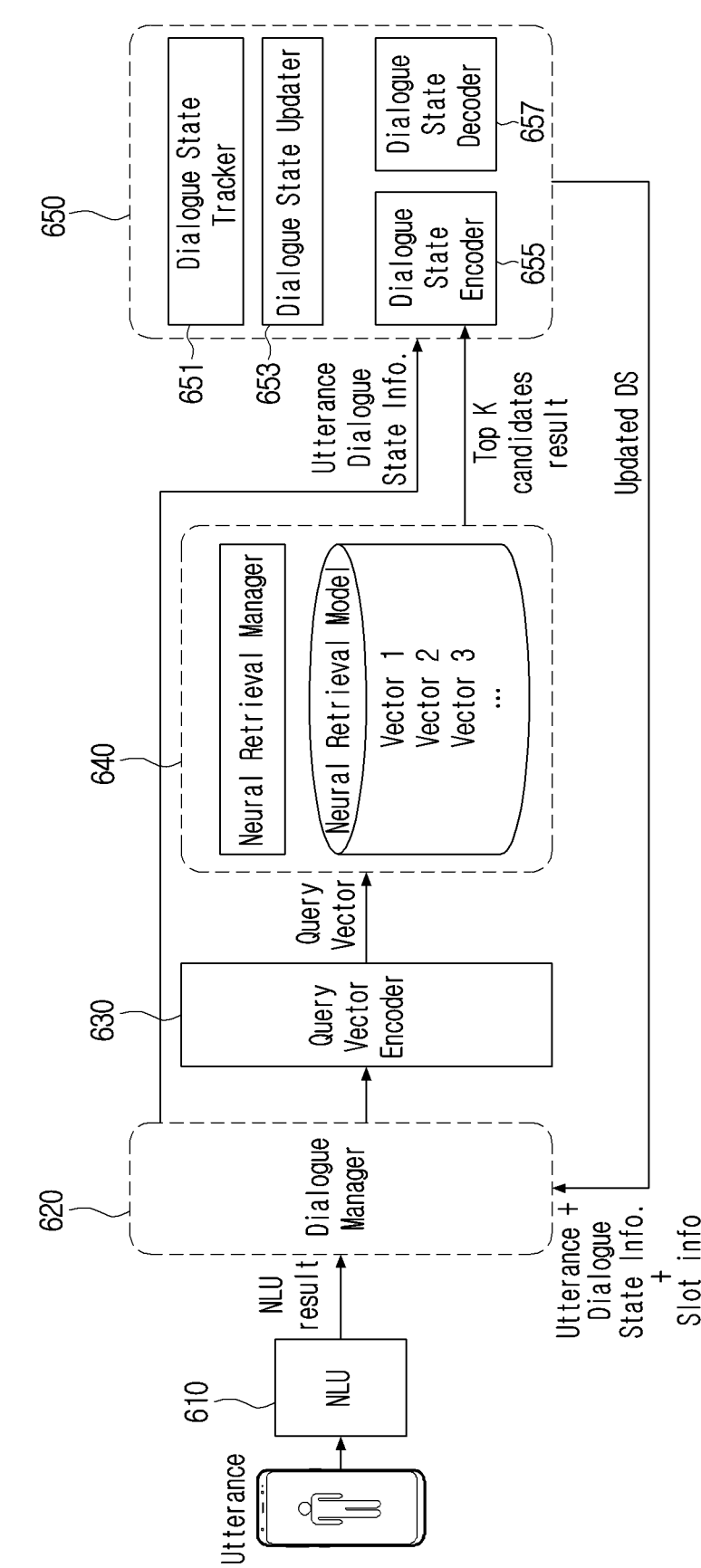
FIG. 6 is a view for explaining a dialogue service model according to an embodiment of the disclosure.

FIG. 6 is a view for explaining a dialogue service model according to an embodiment of the disclosure.

Referring to FIG. 6, a processor 600 may include a natural language understanding (NLU) module 610, a dialogue manager module 620, a query encoder 630, a vector database (DB) 640, and a response module 650.

The NLU module 610 may extract the text included in the dialogue content, and extract the user request (or intent of the user), the slot, and the like from the extracted text. Here, the NLU module 610 may extract the user request or the slot information by using not only the text information, but also various information (e.g., emoticons from which user mood may be predicted, dialogue time, or dialogue frequency) included in the dialogue content.

The dialogue manager module 620 may determine a domain to be used based on the extracted intent of the user and slot, and transmit the corresponding information to the DB or the response model, corresponding to the determined domain.

Here, the dialogue manager module 620 may calculate the weight for the extracted slot. In detail, the text included in the dialogue content may include various slot information, and the included slot information may have high or low correlation with deeply related to the user request (or purpose). It may be advantageous to use the slot information highly correlated with the user request to provide an accurate response to the user request, and the dialogue manager module 620 may thus calculate weight information for each extracted slot.

For example, user text may be "I'm traveling with my friends and family members, book me 4 train tickets to Busan this Friday at 7:00." In this case, the intent of the user may be a reservation of the train tickets, and the slot information may be "this Friday at 7:00," "4 train tickets," "friends and family members," etc. Time, number of reservations, and the like may be main keywords for executing the corresponding service. Accordingly, a higher weight may be assigned to the slot information on information on the time and the number of reservations, and a lower weight may be assigned to a travel purpose, a target, or the like.

On the other hand, the user text may be "I'm going on a trip with my friends and family members this Friday. Where would you like to recommend?" Here, the intent of the user may be a request for a recommendation of a travel destination, and the slot information may be "friends and family members" and "this Friday." The time information and the travel target may be the main keywords for executing the corresponding service, and a higher weight may thus be assigned to the travel target, contrary to the previous example. That is, a fixed weight may not be applied to each keyword, and the slot information may have a weight changed based on its correlation with the above-mentioned intent of the user.

The query encoder 630 may calculate the vector value corresponding to the extracted intent of the user and slot. For example, the query encoder 630 may compose a phrase by using the extracted intent of the user and slot, and calculate the vector value by using the predetermined algorithm. The query encoder 630 may also be implemented to calculate the vector value by processing the phrase input by the user as it is by using the predetermined algorithm, without recomposing the phrase by using the extracted purpose and slot. In addition, as described above, the query encoder 630 may use the weight information for the slot to thus use the slot information having the predetermined weight or more and the user request, thereby recomposing the phrase, and apply the recomposed phrase to the predetermined algorithm to thus calculate the vector value.

The vector DB 640 may compare the similarity between the input vector value and the pre-stored one or more vector values, and search for the candidate vector among the pre-stored one or more vector values. Here, the number of retrieved candidate vectors may be configured in various ways based on a design method. At least two to three candidate vectors may be retrieved, or the candidate vectors may be retrieved from the vectors having a predetermined similarity value. Here, the vector DB 640 may receive the weight information for each slot, and may search for the candidate vector by considering the weight for the slot in the similarity comparison process described above. Detailed configuration and operation of the vector DB 640 are described below with reference to FIG. 7.

The response module 650 may generate the response content by using the dialogue history and the like. In detail, the response module 650 may include a dialogue state tracker 651, a dialogue state updater 653, a dialogue state encoder 655, and a dialogue state decoder 657.

The dialogue state tracker 651 may receive the dialogue history from the dialogue manager module 620, and first determine whether the response information may be generated through the received dialogue history. In case that the response information is possible to be generated through the received dialogue history, the dialogue state tracker 651 may generate the response information by using only the information included in the corresponding dialogue content. That is, the dialogue state tracker 651 may perform the response without using the vector DB.

In case of determining that the response information is difficult to be generated by using only the dialogue history, the dialogue state tracker 651 may control the decoder 657 for the candidate vector value provided from the vector DB 640 to be converted to the text, and generate the response information by using decoded information and the information included in the dialogue content.

In detail, both the information received from the dialogue manager module 620 and the information received through the decoder 657 may be the text information. Therefore, the dialogue state tracker 651 may combine the two text information by performing text embedding, and generate the response information by using the combined information. Here, the dialogue state tracker 651 may combine the two text information by applying a dialogue information gating mechanism whose application is determined based on context information of the dialogue information. The dialogue state tracker 651 may use the gating mechanism to make balance between the received information, which may prevent overuse or underuse of the functions.

In addition, in case that the response is completed, the dialogue state tracker 651 may control the dialogue state updater 653 to update the dialogue state based on the response information generated through the response, the decoded information, and the information included in the dialogue content, and control the encoder 655 to generate the vector value corresponding to the updated dialogue state and store the same in the DB.

Meanwhile, the description provided with reference to FIG. 6 describes that the processor 600 converts the text to the vector value based on the received dialogue information. However, the terminal device may be implemented to perform the encoding operation of converting the text to the vector value, and the processor 600 may be implemented to perform the above-described operation by using the vector value received from the terminal device.

Figure 7:
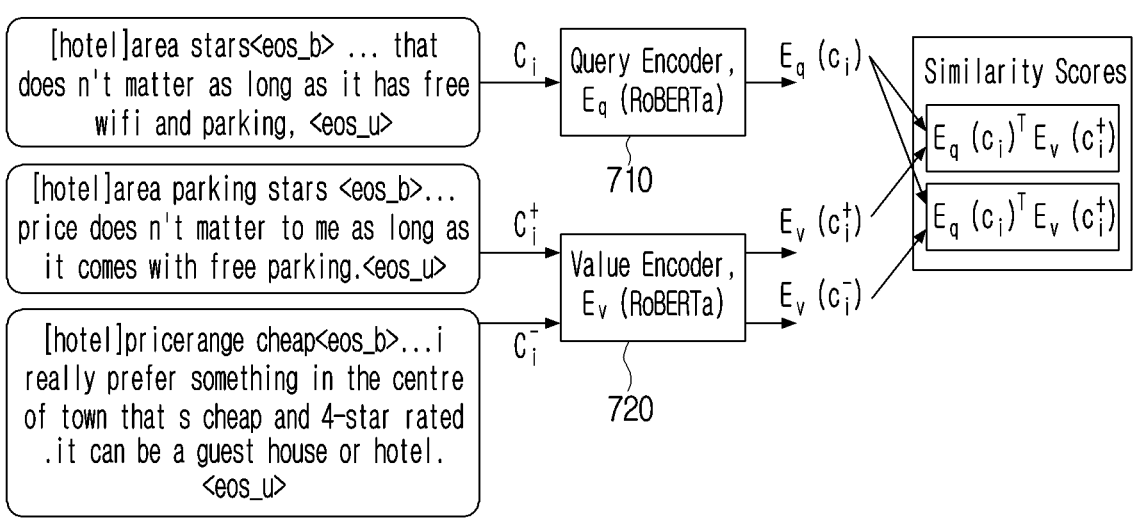
FIG. 7 is a view for explaining a configuration of a vector data base (DB) of FIG. 6 according to an embodiment of the disclosure.
Figure 7:
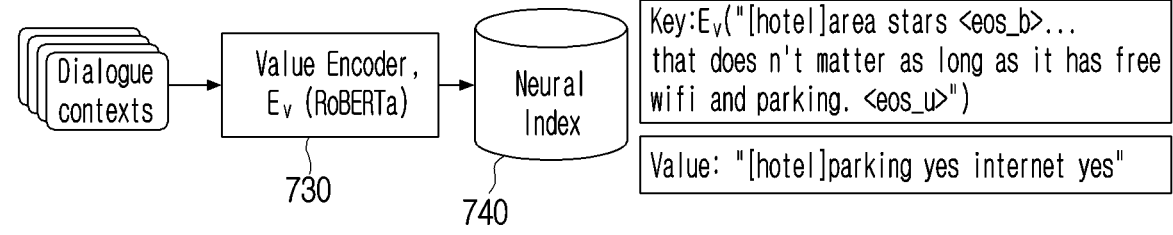

FIG. 7 is a view for explaining a configuration of the vector data base (DB) of FIG. 6 according to an embodiment of the disclosure.

In detail, the vector DB may store the vector values corresponding to the dialogue history information. In order to easily retrieve and use the vector values, the disclosure may structure and index the vector values. A method of constructing the DB is described first.

First, generators of the DB may include a query encoder 710 and a slot encoder 720.

The query encoder 710 may be a module that determines the user request or intent in the text corresponding to the dialogue content. The query encoder 710 may calculate the vector value corresponding to the user request or intent. Here, the query encoder 710 may use not only the text, but also various additional information (e.g., dialogue time, dialogue frequency, or target information other than user) that may be confirmed through the dialogue content.

The slot encoder 720 may be a module that detects detailed items corresponding to the request described above. In detail, the slot encoder 720 may receive the text included in the dialogue content and calculate the vector value corresponding to the slot information by using the received text. Here, the slot encoder 720 may generate a positive context $c_i+$ and a negative context ci−. The slot encoder 720 may also calculate the vector value by using not only the text, but also various additional information that may be confirmed through the dialogue content.

In this way, the DB may calculate the similarity by using the vector values generated by the query encoder 710 and the slot encoder 720.

$$sim(c_i, c_j) = E_q(c_i)^T E_k(c_j) \qquad \text{Equation 1}$$

Here, $c_i$ and $c_j$, may be the text input by the user, $E_q$ may be the query encoder, $E_k$ may be the slot encoder, and sim may be a dot product operator.

In case of calculating the similarity value in this way, the DB may have the plurality of structured vector values by using the calculated similarity value as an index value.

In case that the vector values are structured in this way, the received input text may then be encoded to calculate the vector value (730), and the calculated vector value may be compared with the previously generated index value to retrieve the vector value having the predetermined similarity from the plurality of pre-stored values (740).

For example, as shown in FIG. 7, the user request may be reservation for a specific hotel and include a corresponding value (Wi-Fi, a parking lot, or the like as the slot). In this case, the DB may retrieve the vector value related to the hotel reservation, the parking lot, Wi-Fi, or the like.

Figure 8:
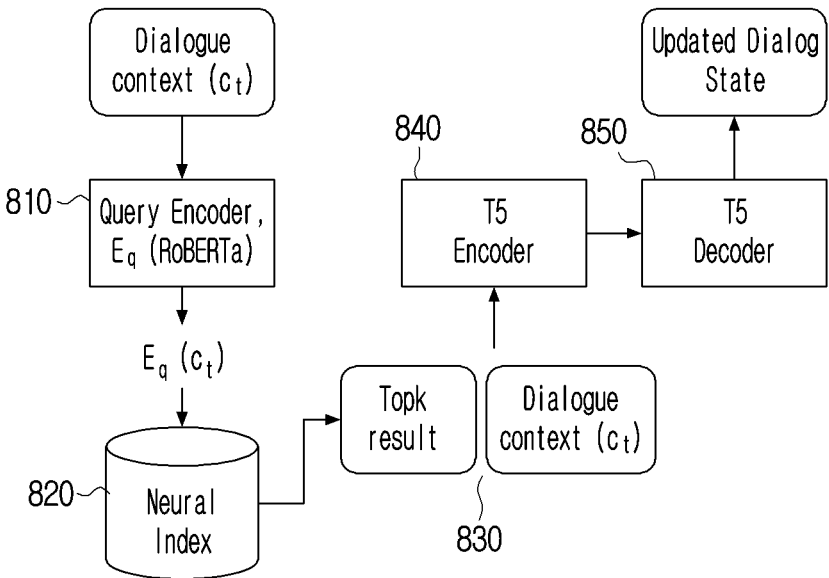
FIG. 8 is a block diagram for explaining an operation of an encoder of FIG. 6 according to an embodiment of the disclosure.

FIG. 8 is a view for explaining another type of the response module according to an embodiment of the disclosure.

Referring to FIG. 8, the response module may include a vector value receiving module 830, an encoder 840, and a decoder 850.

The type of FIG. 8 may be different from that of FIG. 7 above in using a different encoding method. In detail, in FIG. 7, one encoding method may be used in the process of calculating the vector value of the input dialogue content or converting the candidate vector value to the text.

However, in FIG. 8, different algorithms may be used for the encoding method used in the DB search and the encoding method used in the process of using the candidate vector.

For example, the RoBERTa, which is a state of the art (SOTA) pre-trained deep neural networks (DNN) model, may be used in the process of calculating the vector value of a dialogue content 810 using a neural index 820, and T5, which is a SOTA DNN generation model, may be used in a response module (the encoder 840, and the decoder 850). In this way, the encoding and decoding methods having higher performance may be implemented to be used in a specific process.

Figure 9:
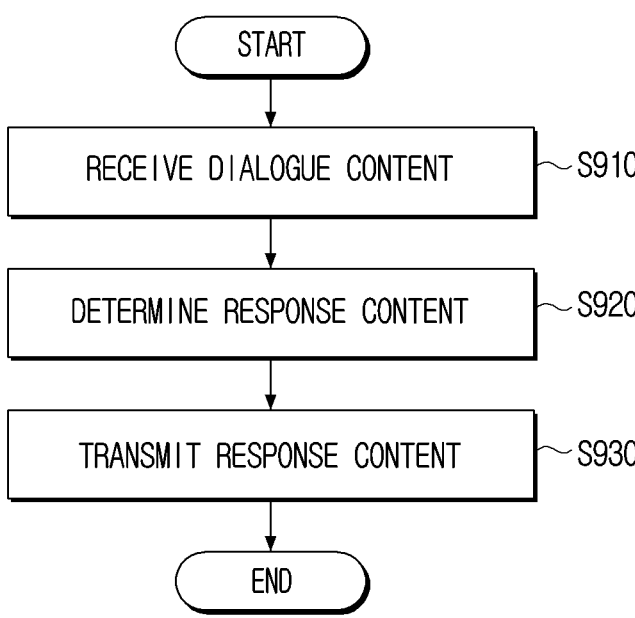
FIG. 9 is a flowchart for explaining a method for controlling an electronic apparatus according to an embodiment of the disclosure.

FIG. 9 is a flowchart for explaining a method for controlling an electronic apparatus according to an embodiment of the disclosure.

First, a vector value corresponding to dialogue history information may be stored. In detail, the respective vector values corresponding to dialogue history information of different users may be stored. Here, the vector value may be calculated using a predetermined encoding algorithm, and the predetermined encoding algorithm may be a bidirectional encoder representations from transformers (BERT) natural language processing model, a RoBERTa natural language processing model, a T5 natural language processing model, or the like.

Dialogue content may then be received at operation S910. The dialogue content may include only one phrase or a plurality of phrases. In addition, the corresponding content may be text, audio data corresponding to a user utterance voice, and may include not only the text but also additional information such as content and time information of a corresponding dialogue.

Response content corresponding to the dialogue content may then be generated at operation S920. In detail, the text may be extracted from the dialogue content.

For example, the extracted text may be used to identify in advance whether the additional information is to be used for obtaining response information. For example, the last phrase of the dialogue content may be used to check a user request of the dialogue content, and slot information included in the dialogue content may be used to determine whether the response information corresponding to the user request may be obtained. In case that additional information is not necessary, the response information may be generated by using only extracted text information.

On the other hand, in case that the additional information is identified as to be being used, the vector value having predetermined similarity may be obtained by using the calculated vector value among the stored one or more vector values, and the response information may be obtained by using the obtained vector value and the calculated vector value.

In addition, the vector value of the extracted text may be calculated by using the predetermined encoding algorithm. For example, character data included in the dialogue content may be generated as one phrase, and a vector may be calculated using the predetermined encoding algorithm for the generated phrase. Alternatively, the character data included in the dialogue content may be divided into phrase units, and the vector may be calculated using the predetermined encoding algorithm for each text of each phrase unit.

In addition, the response information may be obtained using the calculated vector value and the stored one or more vector values. For example, a candidate vector value having the predetermined similarity may be decoded into the text, the slot information may be extracted from the decoded text, and the response information may be generated using the user request, the slot information included in the dialogue content, and the extracted slot information. Here, as described above, the plurality of candidate vector values may exist, each of the plurality of candidate vector values may be converted to the text, and the response information may be generated based on the converted text and the extracted text.

In addition, in order to use the above-described dialogue history in another user dialogue history or a subsequent dialogue process, one text phrase may be generated based on the converted text and the extracted text, a vector of the generated text phrase may be calculated by using the predetermined encoding algorithm, and the calculated vector may be stored.

The response content may then be transmitted, or an event corresponding to the response content may be performed at operation S930.

As described above, the method for controlling an electronic apparatus according to the disclosure may use not only a user dialogue history but also the vector value corresponding to another user dialogue history in the process of generating the response information, thus generating the response information having higher accuracy. In addition, the method may encode and store another user dialogue history by using the predetermined algorithm rather than storing another user dialogue history as it is, thereby preventing the privacy issue.

Figure 10:
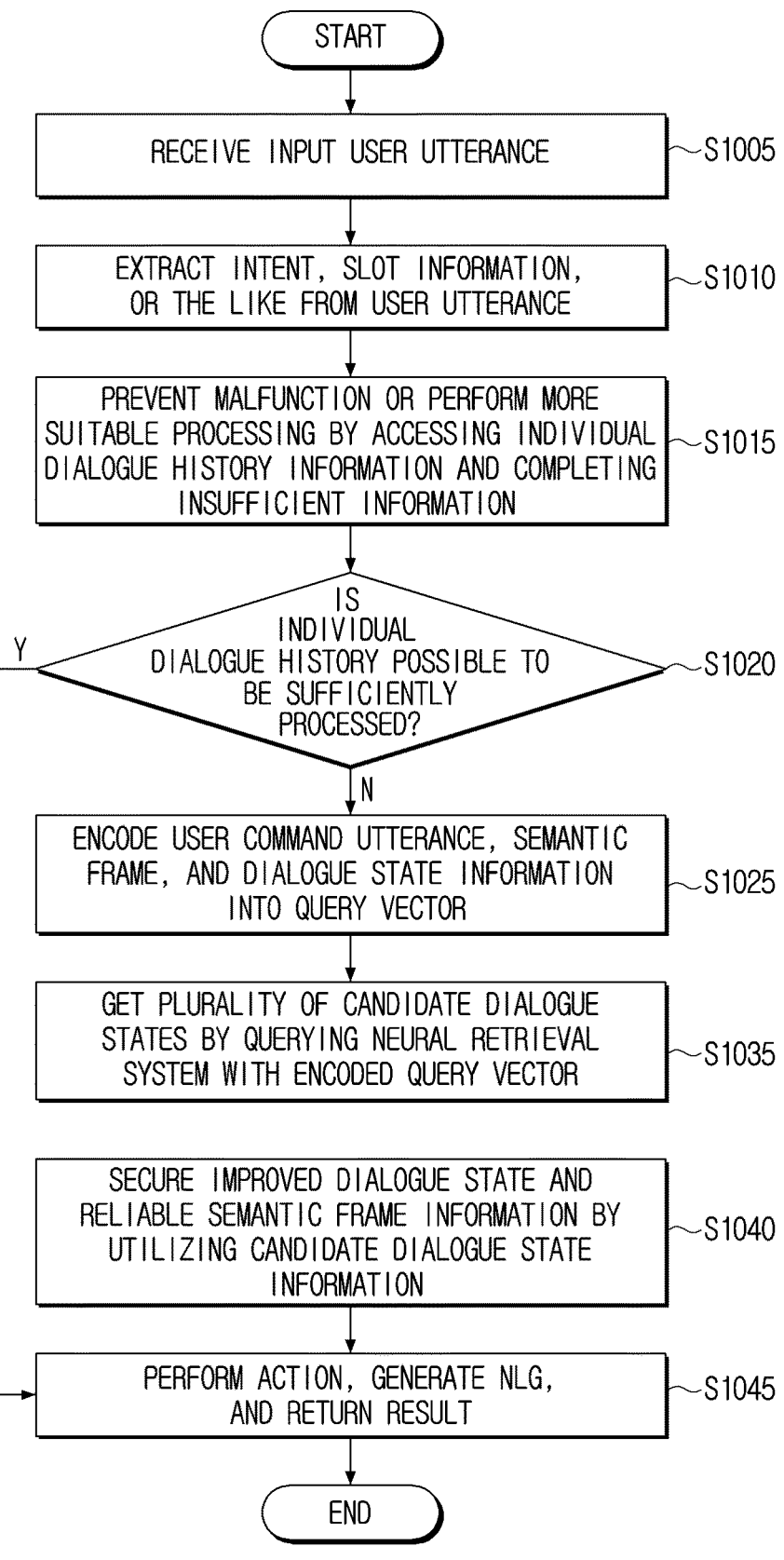
FIG. 10 is a flowchart for explaining a dialogue method of the electronic apparatus according to an embodiment of the disclosure.

FIG. 10 is a flowchart for explaining a dialogue method of the electronic apparatus according to an embodiment of the disclosure.

Referring to FIG. 10, the text information corresponding to the user utterance may be input at operation S1005. Here, only the text information corresponding to the current utterance may be input, and the dialogue content including a previous dialogue history may be input in case that several utterances and response processes are currently in progress. Here, the dialogue content may further include information other than the text, such as current dialogue time and user emotion information that may be confirmed through a separate algorithm.

In addition, user intent and the slot information may be extracted from the user utterance at operation S1010. In detail, the user request that the user intends from the user text and detailed information (or slot information) corresponding to the request may be extracted using the NLU model as described above at operation S1015. Here, not only the text information, but also the additional information (e.g., time, dialogue frequency, or emotion information) may be used.

In addition, it is determined whether the response information may be generated by using only the extracted information at operation S1020.

In case that the response information is sufficiently possible to be generated by using only the extracted information, the response information may be generated by using only the extracted information, and provided to a terminal device of the user or a service corresponding to the response information may be directly performed at operation S1045.

In case that the response information is difficult to be generated by using only the extracted information, the text included in the user utterance information may be calculated as the vector value by using the predetermined encoding algorithm at operation S1025. Here, the vector value may reflect not only the text included in the dialogue content, but also various additional information included in the dialogue content.

In addition, the calculated vector value among the pre-stored one or more vector values and the candidate vector value having the predetermined similarity may be retrieved at operation S1035. In detail, get plurality of candidate dialogue states by querying neural retrieval system with the encoded query.

The response information may then be generated by decoding the retrieved candidate vector value into the text and additionally utilizing the slot information included in the decoded text at operation S1040. In detail, a secure improved dialogue state and reliable semantic frame information by utilizing candidate dialogue state information.

Figure 11:
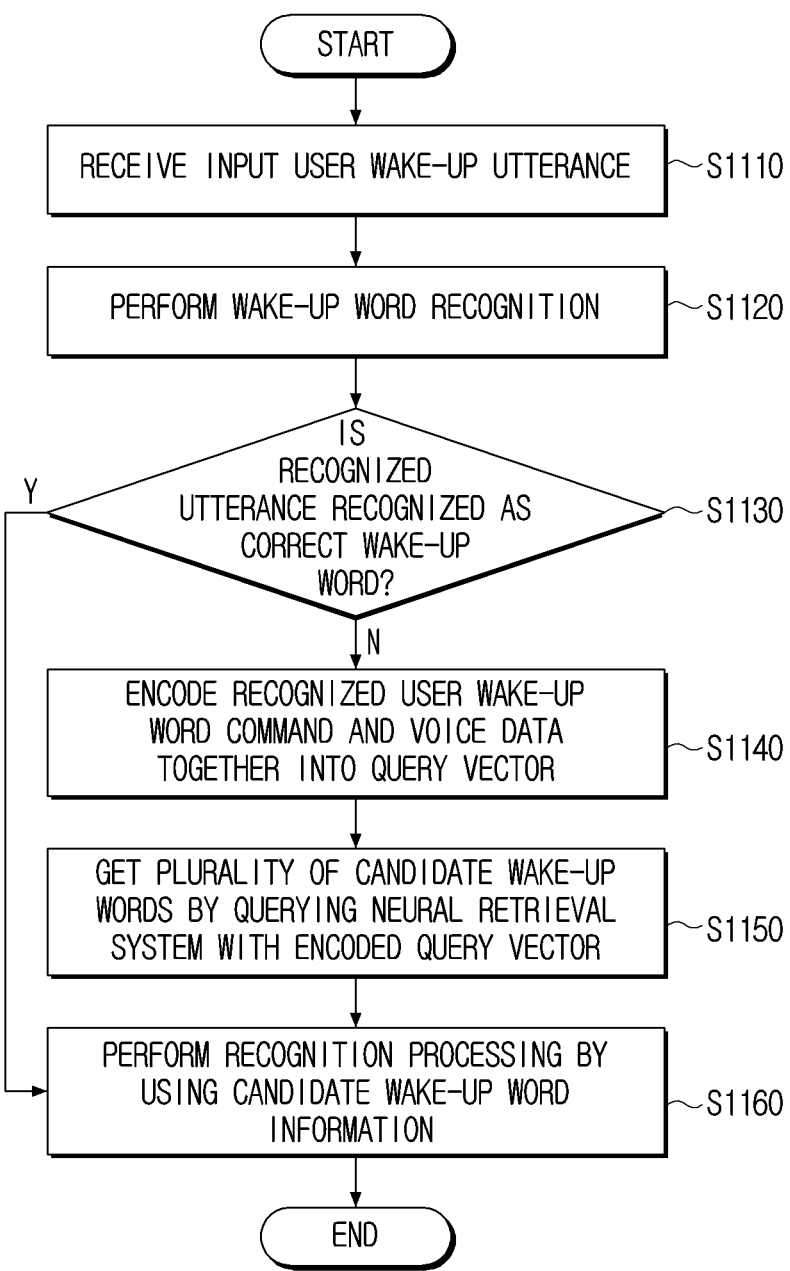
FIG. 11 is a flowchart for explaining a trigger method for the dialogue system according to an embodiment of the disclosure.

FIG. 11 is a flowchart for explaining a trigger method for the dialogue system according to an embodiment of the disclosure.

Referring to FIG. 11, in case that the response information is received in real time at operation S1110, it may be determined whether a wake-up is necessary by comparing received audio data with a pre-stored trigger command at operation S1120.

In case that the corresponding user utterance is recognized as the trigger command at operation S1130, the voice recognition (or dialogue service) may be performed at operation S1160.

In case of not being recognized as an accurate trigger, the corresponding trigger may be vectorized together with the audio data at operation S1140, and it may be confirmed whether a vector value similar to the corresponding trigger exists at operation S1150. These determination and operation may be performed through collaboration with another device (e.g., transmitting information on the current trigger command to a server and receiving a similar trigger command for the same).

In case that a similar vector value exists, the trigger information of the terminal device may be updated using candidate trigger information.

As described above, in the trigger method according to the disclosure, it is possible to register not only triggers set by the user but also the similar trigger, and it is thus possible to respond to the user dialogue service request with higher flexibility.

Figure 12:
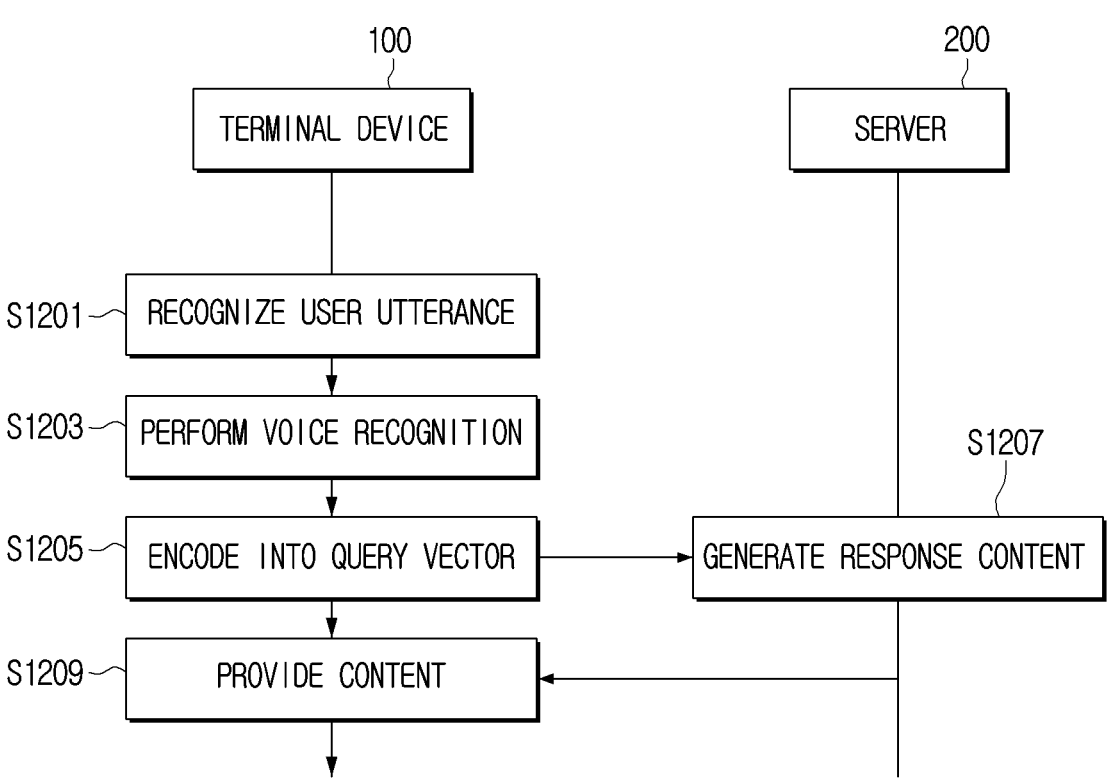
FIG. 12 is a sequence diagram showing an operation of the dialogue system according to an embodiment of the disclosure.

FIG. 12 is a sequence diagram showing an operation of the dialogue system according to an embodiment of the disclosure. In detail, FIG. 12 exemplifies a case where the terminal device 100 performs the encoding of the dialogue information.

Referring to FIG. 12, in case of receiving the user utterance from the user at operation S1201, the terminal device 100 may perform the voice recognition of the received utterance to generate the dialogue information (i.e., text) corresponding to the user utterance at operation S1203.

In case that the utterance for the corresponding service is continuously in progress, the terminal device 100 may store the corresponding text and the dialogue content including and the previous response from the server 200.

The terminal device 100 may then generate the vector value by using the text included in the above-mentioned dialogue content and predetermined encoding algorithm at operation S1205. Here, the terminal device 100 may calculate the vector value by using only the dialogue text of the last turn included in the above-mentioned dialogue content. Alternatively, the terminal device 100 may recognize the user intent and the slot information, by using all the dialogue text included in the above-mentioned dialogue content, generate one phrase by using the recognized user intent and slot information, and convert the generated phrase to a vector by using the predetermined encoding algorithm.

Here, the terminal device 100 may check the user intent and slot of the dialogue text included in the dialogue content by using the natural language understanding algorithm, and generate one phrase by using the confirmed user intent and slot information. Alternatively, the terminal device 100 may be implemented to calculate the vector value for each dialogue text included in the dialogue content in turn units (or character units) and transmit the calculated vector value to the server 200.

In addition, the terminal device 100 may calculate the vector value by reflecting not only the dialogue text but also the additional information such as the current dialogue time, the dialogue frequency, and the predicted user emotion.

The server 200 may receive the vector value, and generate the response information based on the received vector value at operation S1207. In detail, the server 200 may select the vector value having the predetermined similarity with the received vector value among the stored one or more vector values, convert each of the selected vector value and the received vector value into the text by using the predetermined decoding algorithm, and generate the response content (or response information) by using the user request and the slot information, confirmed using the text corresponding to the received vector value, and the slot information confirmed using the vector value with the predetermined similarity.

In case that the response content is generated, the server 200 may transmit the generated response content to the terminal device 100. The terminal device 100 receiving the response content may then perform the corresponding response content at operation S1209.

As described above, in this embodiment, the user dialogue information may be vectorized and then provided to the server 200, rather than being provided directly thereto, thereby minimizing the user's privacy issue.

Meanwhile, the term "part" or "module" used in the disclosure may include a unit including hardware, software or firmware, and may be used interchangeably with the term, for example, logic, a logic block, a component or a circuit. The "part" or "module" may be an integrally formed component, or a minimum unit or part performing one or more functions. For example, the module may include an application-specific integrated circuit (ASIC).

The various embodiments of the disclosure may be implemented by software including an instruction stored in a machine-readable storage medium (e.g., computer-readable storage medium). The machine may be a device which may evoke a stored instruction word from the storage medium, and operated based on the evoked instruction word, and may include an electronic apparatus (e.g., electronic apparatus 300) according to the disclosed embodiments. In case that the instruction is executed by the processor, the processor may directly perform a function corresponding to the instruction or other components may perform the function corresponding to the instruction under a control of the processor. The instruction may include codes provided or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

According to still another embodiment, the method disclosed in the various examples of the disclosure may be included and provided in a computer program product. The computer program product may be traded as a product between a seller and a purchaser. The computer program product may be distributed in the form of a non-transitory machine-readable storage medium (for example, a compact disc read only memory (CD-ROM)) or online through an application store (for example, PlayStore™). In case of the online distribution, at least portions of the computer program product may be at least temporarily stored or temporarily provided in a non-transitory storage medium such as a memory of a server of a manufacturer, a server of an application store or a relay server.

Each of components (for example, modules or programs) in the various examples may include a single entity or a plurality of entities, and some of the corresponding sub-components described above may be omitted or other sub-components may be further included in the various examples. Alternatively or additionally, some of the components (for example, the modules or the programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, and at least some of the operations may be performed in a different order or be omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a communication device;
   a memory configured to store at least one instruction and one or more vector values corresponding to dialogue history information, wherein the dialogue history information includes at least one of user dialogue history or another user dialogue history; and
   a processor, based on execution of the at least one instruction, configured to:
      receive dialogue content through the communication device,
      extract text from dialogue content,
      calculate a vector value of the extracted text by using a predetermined encoding algorithm,
      obtain a plurality of candidate vector values each having the predetermined similarity with the calculated vector value among the stored one or more vector values corresponding to dialogue history information,
      decode each of the obtained plurality of candidate vector values into the text,
      confirm slot information in the decoded text,
      confirm a user request and slot information in the extracted text,
      generate the response information by using the confirmed user request and the confirmed slot information in the extracted text, and the confirmed slot information in the decoded text, and transmit the generated response information to an external device through the communication device.

2. The apparatus as claimed in claim 1, wherein the processor, based on the execution of the at least one instruction, is further configured to:

extract additional information from the received dialogue content, wherein the vector value is calculated by additionally using the extracted additional information, and wherein the additional information includes at least one of time information, dialogue frequency, or user emotion information of the dialogue content.

3. The apparatus as claimed in claim 1, wherein the processor, based on the execution of the at least one instruction, is further configured to:

identify whether additional information is to be used to generate the response information, and obtain a vector value having predetermined similarity with the calculated vector value among the stored one or more vector values in case of identifying that the additional information is to be used, and wherein the response information is generated by additionally using the obtained vector value.

4. The apparatus as claimed in claim 3, wherein the processor, based on the execution of the at least one instruction, is further configured to:

confirm a user request and slot information by using the extracted text, and determine whether the response information corresponding to the user request is possible to be obtained using the confirmed slot information.

5. The apparatus as claimed in claim 1, wherein the processor, based on the execution of the at least one instruction, is further configured to:

determine a weight for each confirmed slot information by using the dialogue content, and obtain the vector value having the predetermined similarity with the calculated vector value among the stored one or more vector values by using the determined weight.

6. The apparatus as claimed in claim 1, wherein the processor, based on the execution of the at least one instruction, is further configured to:

generate one text phrase by using text corresponding to the vector value having the predetermined similarity and the text extracted from the dialogue content, calculate a vector of the generated text phrase by using the predetermined encoding algorithm, and store the calculated vector in the memory.

7. A method performed by an electronic apparatus, the method comprising:

storing one or more vector values corresponding to dialogue history information, wherein the dialogue history information includes at least one of user dialogue history or another user dialogue history;

receiving dialogue content through a communication device included in the electronic apparatus;

generating response information corresponding to the dialogue content; and transmitting the generated response information through the communication device, wherein the generating of the response information includes:

extracting text from the dialogue content;

calculating a vector value of the extracted text by using a predetermined encoding algorithm;

obtaining a plurality of candidate vector values each having the predetermined similarity with the calculated vector value among the stored one or more vector values corresponding to dialogue history information;

decoding each of the obtained plurality of candidate vector values into the text;

confirming slot information in the decoded text;

confirming a user request and slot information in the extracted text; and generating the response information by using the confirmed user request and the confirmed slot information in the extracted text, and the confirmed slot information in the decoded text.

8. The method as claimed in claim 7, wherein in the calculating of the vector value, additional information is extracted from the received dialogue content, wherein the vector value is calculated by additionally using the extracted additional information, and wherein the additional information includes at least one of time information, dialogue frequency, or user emotion information of the dialogue content.

9. The method as claimed in claim 7, wherein the generating of the response information further includes:

determining a weight for each confirmed slot information by using the dialogue content; and obtaining the vector value having the predetermined similarity with the calculated vector value among the stored one or more vector values by using the determined weight.

10. The method as claimed in claim 7, further comprising:

generating one text phrase by using text corresponding to the vector value having the predetermined similarity and the text extracted from the dialogue content;

calculating a vector of the generated text phrase by using the predetermined encoding algorithm; and storing the calculated vector.

11. A non-transitory computer-readable recording medium including a program for executing a method for controlling an electronic apparatus, wherein the method includes:

storing one or more vector values corresponding to dialogue history information, wherein the dialogue history information includes at least one of user dialogue history or another user dialogue history;

receiving dialogue content through a communication device included in the electronic apparatus;

generating response information corresponding to the dialogue content; and transmitting the generated response information through the communication device, wherein the generating of the response information includes:

extracting text from the dialogue content;

calculating a vector value of the extracted text by using a predetermined encoding algorithm;

obtaining a plurality of candidate vector values each having the predetermined similarity with the calculated vector value among the stored one or more vector values corresponding to dialogue history information;

decoding each of the obtained plurality of candidate vector values into the text;

confirming slot information in the decoded text;

confirming a user request and slot information in the
extracted text; and generating the response information by using the confirmed user request and the confirmed slot information in the extracted text, and the confirmed slot information in the decoded text.

\* \* \* \* \*